United States Patent [19]
Worrall

[11] 3,854,861
[45] Dec. 17, 1974

[54] ROLLERS FOR SHAPING SHEET MATERIAL

[75] Inventor: Geoffrey Worrall, Wantage, England

[73] Assignee: United Kingdom Atomic Energy Authority, London, England

[22] Filed: Dec. 4, 1972

[21] Appl. No.: 311,529

[30] Foreign Application Priority Data
Feb. 22, 1972 Great Britain ............ 8086/72

[52] U.S. Cl. ........ 425/504, 156/205, 156/210, 156/555, 264/286, 425/388, 425/505, 425/508
[51] Int. Cl. .................................. B29d 9/00
[58] Field of Search .......... 425/383, 388, 403, 407, 425/303, 343, 363, 369, 504, 505, 508, 515, 520; 29/121 R; 264/90, 286; 156/40, 183, 205, 210, 555

[56] References Cited
UNITED STATES PATENTS

| | | |
|---|---|---|
| 2,708,472 | 5/1955 | Rowlands ............... 425/383 X |
| 2,905,969 | 9/1959 | Gilbert et al. ............ 425/388 X |
| 3,026,231 | 3/1962 | Chauannes ............... 156/205 |
| 3,179,726 | 4/1965 | Perry ..................... 425/388 X |
| 3,226,458 | 12/1965 | Gräff et al. ............. 425/388 X |
| 3,231,647 | 1/1966 | Oesterheld .............. 425/388 X |
| 3,540,079 | 11/1970 | Bush ..................... 425/388 X |
| 3,632,252 | 1/1972 | Amberg et al. ........... 425/388 X |
| 3,676,247 | 7/1972 | Morris et al. ............ 264/286 X |

Primary Examiner—C. W. Lanham
Assistant Examiner—Joseph A. Walkowski
Attorney, Agent, or Firm—Larson, Taylor and Hinds

[57] ABSTRACT

One of a pair of rollers for handling sheet material is of hollow construction and is made porous so that application of a suction to the interior of the roller results in the sheet material being sucked on to the exterior of the roller.

The roller has a corrugated periphery so that sheet material becomes corrugated by sucking it on to the exterior of the roller.

The arrangement dispenses with the need for intermeshing corrugated rollers. Hence roller wear is reduced substantially.

4 Claims, 1 Drawing Figure

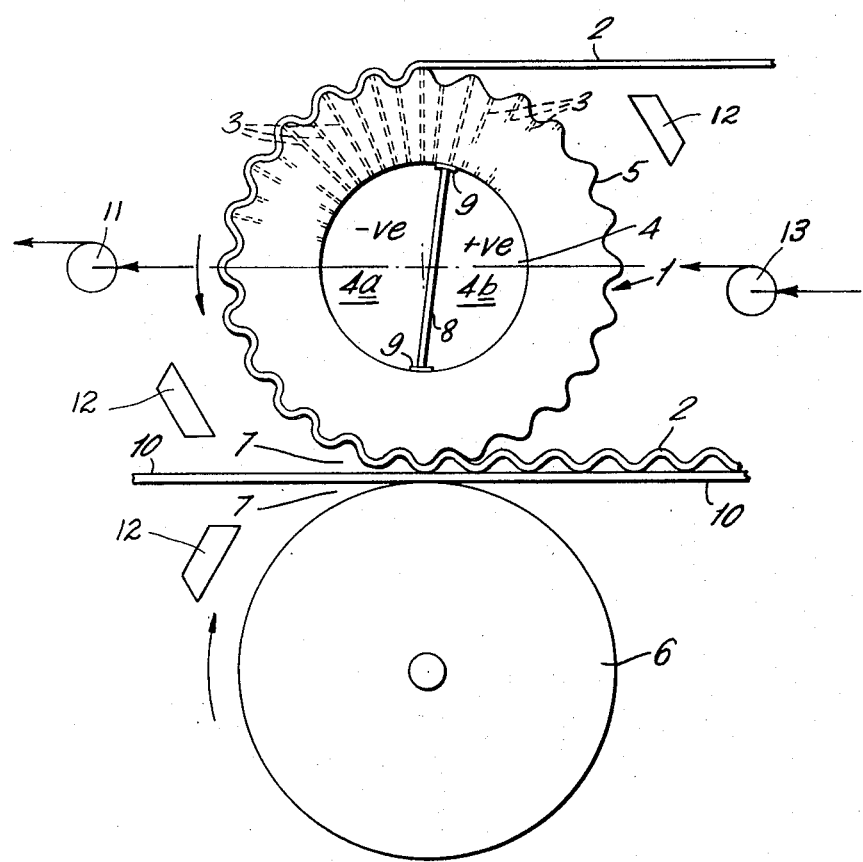

ROLLERS FOR SHAPING SHEET MATERIAL

This invention relates to rollers for shaping sheet material.

A problem exists in manufacturing bandoleer like strips of silicon plastic sheet material.

A present method of such manufacture makes use of three rollers, the rotational axes of which lie in the same vertical plane. The central and upper rollers are of corrugated form and the lower roller has a plain surface. The central roller is driven and a sheet of silicon plastic material is fed into the upper nip formed by intermeshing corrugations of the upper and central rollers whereby the strip becomes corrugated. The corrugated portion of the sheet is then carried around on the surface of the central roller and into the lower nip formed by the central and lower rollers. Another sheet of silicon plastic material is fed into the lower nip at the same time and the two sheets are then secured to each other by pressure welding.

High surface loadings are imposed on the side surfaces of the corrugations of the upper and central rollers as the silicon plastic material passes through the intermeshing corrugations of the upper nip. Because silicon plastic is an abrasive material this loading results in substantial wear of the corrugations. Furthermore, when foreign bodies such as grit are present, this can result in substantial damage as well as wear.

It therefore becomes an object of this invention to reduce this wear and damage and also to reduce the number of rollers required for the abovementioned method of manufacture.

According to the invention, a roller for shaping sheet material is of corrugated form and of hollow, porous construction, so that application of a suction to the interior of the roller results in the sheet material being sucked on to the corrugations of the roller.

As the sheet material is corrugated by sucking it on to the exterior of the roller, the need for intermeshing corrugated rollers is dispensed with and hence roller wear is reduced substantially.

The interior of the roller may be divided into compartments by partition means. A suction may then be applied to one compartment and a pressure to another. Application of a pressure to one of the compartments will tend to dislodge the sheet material from the roller.

An embodiment of the invention will now be described by way of example with reference to the accompanying semi-diagrammatic drawing which is a side view in medial section.

With reference to the drawing, a metal roller 1 for shaping sheet material 2 is of hollow construction and is made porous as indicated by the passageways 3 so that application of a suction to the interior 4 of the roller by a pump 11 results in the sheet material 2 being sucked on to the exterior of the roller 1.

In further detail, the exterior of the roller 1 is formed with a plurality of corrugations extending substantially parallel to the axis of the roller. The corrugated roller 1 is driven by an electric motor (not shown) and cooperates with a lower, plain roller 6 also of metal whereby a nip 7 is formed by the two rollers. The roller 6 is freely rotatable. The rollers 1, 6, are heated to about 40° C by radiant heaters 12. The sheet material 2 is silicon plastics, which is a thermo-plastics material and thus softens when heated.

The hollow interior 4 of the roller 1 is divided by partition means 8 into separate compartments 4a, 4b. The partition means 8 comprise a stationary baffle extending lengthwise through the interior 4 and provided with rubbing seals 9 which cooperate with the wall of the interior in preserving a seal. A suction is applied to compartment 4a so that as the sheet material 2 is passed over the top of the roller 1 the softened material is sucked into the corrugations 5 on the exterior of the roller whereby it becomes corrugated.

The corrugated sheet material 2 is carried around, by suction, on the exterior of the roller 1 so that it enters the nip 7. As the corrugated sheet material 2 enters the nip 7 a non-corrugated sheet 10 of the same material is fed into the nip. Passage of the two sheets 2, 10 through the nip 7 of the heated rollers results in the sheets being secured together by pressure welding so as to form a bandoleer-like strip.

After passage through the nip 7, the bandoleer-like strip formed by the sheets 2, 10 is kept clear of the rollers 1, 6, by pressurised air applied by a pump 13 to the compartment 4b, which air dislodges the corrugated sheet 2 from the corrugations 5 by blowing it away.

The bandoleer-like strip is subsequently wound around a mandrel and the whole sintered in a nitrogen atmosphere to form a matrix of silicon nitride, which matrix can be used as a heat-exchanger.

The porous roller 1 may be manufactured by sintering metal powder.

If desired, both of the rollers 1 and 6 may be driven.

The invention allows the bandoleer-like strip to be manufactured by using two, instead of three rollers.

I claim:

1. Apparatus comprising a pair of rollers defining a nip through which superimposed sheets of thermoplastic material may be passed so as to be welded together to form bandoleer-like articles, one of said pair of rollers having a corrugated periphery and the other roller having a plain periphery, the corrugated roller also having a hollow center, a plurality of airflow passageways extending between the hollow center and the corrugated periphery, stationary partition means for dividing the hollow center into two separate compartments which, at the interior surface of the hollow roller, are located on opposite sides of a plane through the nip and the centers of the two rollers such that as the corrugated roller rotates, passageways on opposite sides of the said plane through the nip are connected to different of said compartments, air suction means for connecting to suction the compartment from which, as the corrugated roller rotates, the passageways on the entry side of the nip extend, air discharge means for connecting to a pressure source the compartment from which, as the corrugated roller rotates, the passageways on the exit side of the nip extend and means for heating the rollers.

2. Apparatus as claimed in claim 1 wherein the corrugated roller is of porous form.

3. Apparatus as claimed in claim 1 wherein the corrugated roller is of sintered construction.

4. Apparatus as claimed in claim 1 wherein the stationary partition means comprise a stationary baffle and including rubbing seals disposed between the baffle and the surface of the hollow center.

* * * * *